United States Patent [19]

McNeely

[11] Patent Number: 4,692,889
[45] Date of Patent: Sep. 8, 1987

[54] CIRCUITRY FOR CALCULATING MAGNITUDE OF VECTOR SUM FROM ITS ORTHOGONAL COMPONENTS IN DIGITAL TELEVISION RECEIVER

[75] Inventor: David L. McNeely, Indianapolis, Ind.

[73] Assignee: RCA Corporation, Princeton, N.J.

[21] Appl. No.: 655,657

[22] Filed: Sep. 28, 1984

[51] Int. Cl.$^4$ ............................................. G06F 7/556
[52] U.S. Cl. ................................... 364/730; 358/23; 358/27; 358/28; 364/715
[58] Field of Search ...................... 358/27, 28, 37, 23; 364/730, 731, 752, 729

[56] References Cited

U.S. PATENT DOCUMENTS

| | | | |
|---|---|---|---|
| 4,523,221 | 6/1985 | Chin et al. | 358/28 |
| 4,528,586 | 7/1985 | Lewis, Jr. et al. | 358/28 |
| 4,544,944 | 10/1985 | Chin | 358/28 |
| 4,562,460 | 12/1985 | Harwood | 358/28 |
| 4,587,552 | 5/1986 | Chin | 364/730 |
| 4,599,701 | 7/1986 | Vojir et al. | 364/752 |

Primary Examiner—Archie E. Williams, Jr.
Assistant Examiner—Dale M. Shaw
Attorney, Agent, or Firm—P. J. Rasmussen; E. P. Herrmann; D. A. Kulkarni

[57] ABSTRACT

An arrangement is provided for computing the magnitude value of the vector sum of two quadrature-related component signals I and Q with a minimal of hardware. To this end, the magnitude values of the orthogonal I and Q signals are applied to a ROM as address codes to produce the $\text{Log}_B |I|$ and $\text{Log}_B |Q|$ values to the logarithmic base B. The smaller of the $\text{Log}_B |I|$ and $\text{Log}_B |Q|$ logarithmic values is subtracted from the larger of the logarithmic values to produce the absolute value $|D|$ of the difference between the respective logarithmic values. The difference value D is applied to a ROM as an address code which is programmed to generate a correction value $F = 0.5 \text{Log}_B(1 + B^{-2|D|})$. The correction value F is added to the larger of the two logarithmic values, and the antilog of the sum is computed to determine the magnitude value C of the vector sum of the two quadrature signals I and Q.

12 Claims, 3 Drawing Figures

CIRCUITRY FOR CALCULATING MAGNITUDE OF VECTOR SUM FROM ITS ORTHOGONAL COMPONENTS IN DIGITAL TELEVISION RECEIVER

The present invention relates to circuitry for calculating the value of the magnitude of the vector sum of two orthogonally-related component signals. More particularly, it is directed toward reducing the circuitry needed to perform the required calculations. The invention has general applicability, but is particularly useful in digital television receivers where it is desired to perform digital video signal processing with a minimum of hardware.

In many electronic systems, it is necessary to determine the magnitude of the vector sum of the orthogonal signals. For example, in digital TV receivers, it is convenient to perform automatic flesh color correction by manipulating the magnitude and phase of the chrominance vector. The chrominance signal, is usually available in the form of quadrature signals represented by the I and Q color difference signals or the (R-Y) and (B-Y) color difference signal. Thus, to perform the required manipulation, the magnitude of the chrominance vector must be determined from its perpendicularly-disposed component parts.

It is well known that the magnitude of a resultant vector may be ascertained by generating the square root of the sum of the squares of the amplitude values of its orthogonal components. This may be accomplished with the use of multiplier circuitry for squaring the amplitude values, adder circuitry for summing the squares, and square root circuitry for determining the square root of the sum. Alternatively, the function may be performed by applying the magnitude values of the component vectors as address codes to a read-only memory programmed to generate output values corresponding to the magnitude of the vector sum of the applied address codes.

It will be readily apparent to those skilled in the art of signal processing that each of the foregoing methods require significant amounts of processing hardware and the required hardware increases superlinearly with increasing signal bits. In addition, the necessary components are not readily available to perform real time processing for wide band signals. These factors are particularly restrictive shortcomings in a digital television receiver context, where it is desirable to maintain the number of circuit components to a minimum and the components are to be realized in VLSI integrated form.

The vector sum magnitude calculating circuitry, in accordance with the present invention, converts the magnitude values of the quadrature-related I and Q signals to produce the $\text{Log}_B |I|$ and $\text{Log}_B |Q|$ sample values to the logarithmic base B. The $\text{Log}_B |I|$ and $\text{Log}_B |Q|$ sample values are subtractively combined to form the difference value $D = \text{Log}_B |I| - \text{Log}_B |Q|$. The difference value is utilized to compute a correction value equal to $0.5 \text{Log}_B (1 + B^{-2D})$. The correction value is added to the corresponding $\text{Log}_B |I|$ value, and the antilog of the sum is generated to produce the magnitude value of the vector sum C of the quadrature-related component vectors I and Q.

Pursuant to a further embodiment of the present invention, the subject vector sum magnitude calculating circuitry converts the magnitude values of the orthogonal I and Q signals into the corresponding $\text{Log}_B |I|$ and $\text{Log}_B |Q|$ sample values to the logarithmic base B. The $\text{Log}_B |I|$ and $\text{Log}_B |Q|$ sample values are subtractively combined to form the absolute value of the difference: $|D| = |\text{Log}_B |I| - \text{Log}_B |Q||$. The absolute difference values $|D|$ is utilized to calculate a correction value equal to $0.5 \text{Log}_B (1 + B^{-2|D|})$. The larger of the logarithmic values $\text{Log}_B |I|$ and $\text{Log}_B |Q|$ is additively combined with the associated correction value and the $\text{Antilog}_B$ of the sum is determined to produce the magnitude value of the vector sum C.

Figure 1:
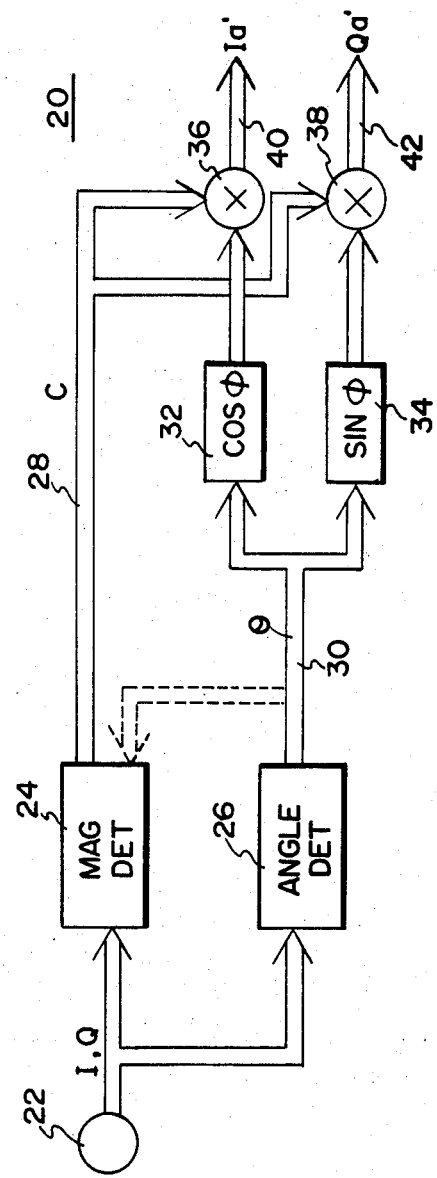
FIG. 1 is a block diagram of exemplary prior art circuitry for performing auto-flesh correction in a digital television receiver.

The circuitry 20 of FIG. 1 exemplifies an apparatus for performing auto-flesh correction in a digital television receiver. The auto-flesh correction circuitry 20 is located in the color signal processing section of the receiver and operates upon the quadrature-related color component vectors I and Q of the chrominance signal C after separation thereof from the composite video signal. The presumption is made that the chrominance signal samples C occur at 4 times the color subcarrier rate (e.g., 3.58 MHz), and that the samples are phased to correspond with the I and Q axes. This results in a stream of I and Q magnitude values in a certain sequence: $+I_n, +Q_n, -I_n, -Q_n, +I_{n+1}, +Q_{n+1}, -I_{n+1}, -Q_{n+1}$ and so on, where n, n+1, etc., represent the cycle numbers of the sampled chrominance signal C. It will be noted that the + and − signs represent sampling phase, and not the sample polarity. It is further assumed that the sample values are in the digital format (e.g., 8-bit parallel PCM signals). A detailed description of a circuit of this type may be found in U.S. Pat. No. 4,544,944 entitled AN AUTO TINT CIRCUIT FOR A TV RECEIVER incorporated herein by reference. Reference may be also made to U.S. Pat. No. 4,402,005, issued to Lewis, Jr., and entitled CLOCK GENERATOR FOR A DIGITAL COLOR TELEVISION SIGNAL RECEIVER, for a description of an illustrative circuit for generating a suitable stream of I and Q amplitude values.

Briefly the FIG. 1 circuit 20 operates as follows. Auto-flesh correction is performed by rotating the chrominance vector C toward the I component vector whenever the phase angle of the chrominance vector is within a particular range of values associated with flesh colors. The chrominance vector C, however, is represented by its component parts in the form of the substantially orthogonal color difference signal vectors I and Q or alternatively, by the orthogonal color difference signals (R-Y) and (B-Y). For descriptive purposes, the invention will be explained using the I and Q component signals. The circuit 20 outputs a rotated chrominance signal represented by substantially orthogonal color difference signals I' and Q' corresponding to the rotated chrominance vector C'.

The I and Q signal sample stream is applied to terminal 22 from which it is routed to a magnitude detector 24 and an angle detector 26. The magnitude detector 22 generates, in accordance with the present invention, a magnitude value of the vector sum C of the orthogonal I and Q signal components, e.g., $C = \sqrt{I^2 + Q^2}$ and produces this signal on bus 28. The angle detector 26 produces a signal on bus 30 representing the angle $\theta$ corresponding to the angle between the chrominance vector C and the I sampling axis. The angle signal $\theta$ is applied as address codes to ROM's 32 and 34 which produce respectively, the sine and cosine values of the arguments corresponding to the address codes applied to their inputs. For angles $\theta$, which do not reside within the range of angles ascribed to flesh tones, the ROM's are programmed to output the sines and cosines of the applied angle values. For angles $\theta$, which are within the range of angles associated with flesh tones, the ROM's produce sines and cosines of angles corresponding to $\theta + \Delta\theta$ where $\Delta\theta$ represents the desired rotation and is a function of $\theta$.

The cosine and sine values are respectively applied to multipliers 36 and 38 wherein they are multiplied by the magnitude values C generating the flesh-corrected component vectors $I' = C \cos\theta$ and $Q' = C \sin\theta$ on the buses 40 and 42.

Figure 2:
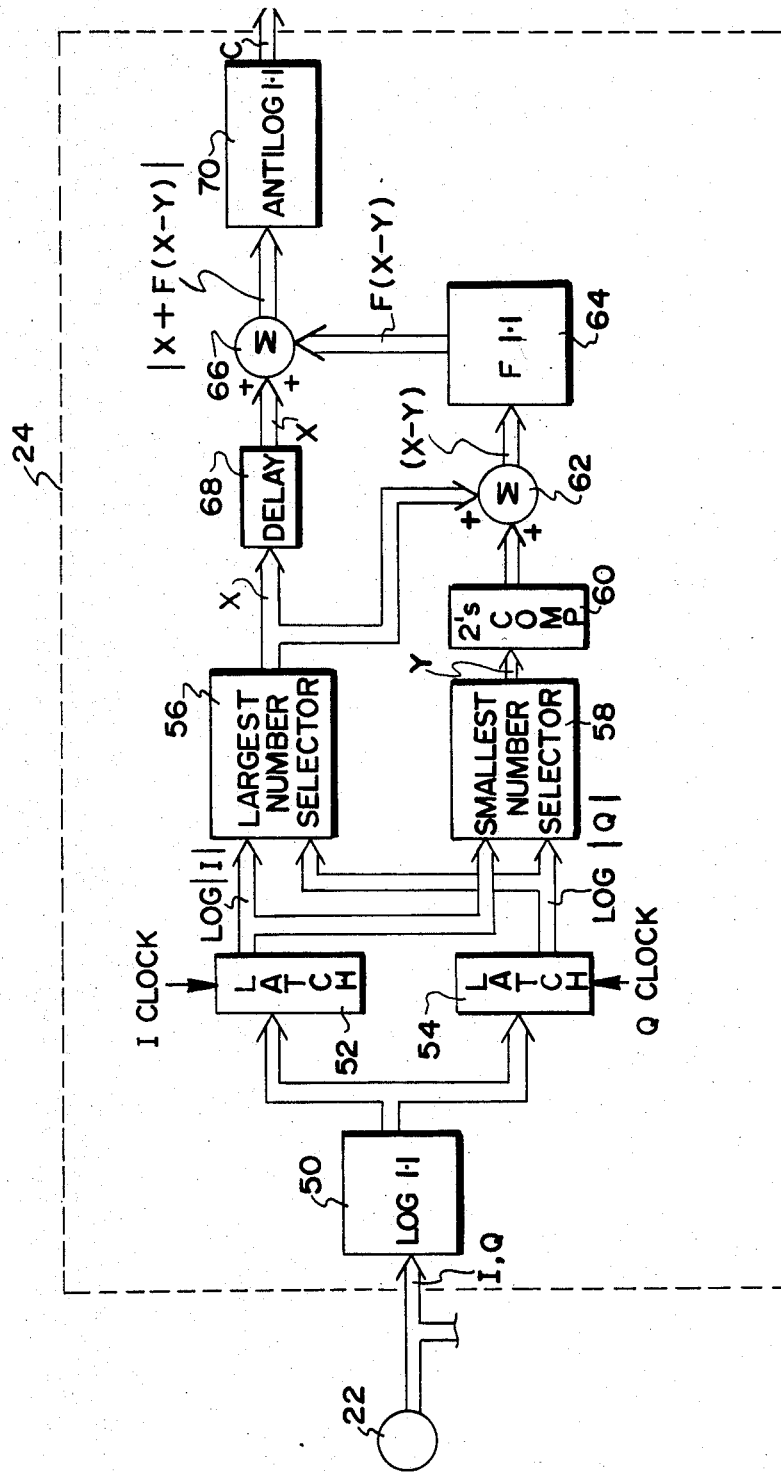
FIG. 2 is a block diagram of circuitry for generating the magnitude of the vector sum of orthogonal vectors embodying the present invention.

FIG. 2 illustrates the circuitry embodying the present invention, which may be substituted for the magnitude detector 24 of FIG. 1. The FIG. 2 circuitry 24 generates the magnitude of the vector sum C of the quadrature-related component signals I and Q.

The operation of the instant magnitude detector 24 can be better understood from the following theoretical development.

$$C = \sqrt{I^2 + Q^2}$$

$$\begin{aligned}
\mathrm{Log}_B C &= \mathrm{Log}_B \sqrt{I^2 + Q^2} \\
&= 0.5\, \mathrm{Log}_B (I^2 + Q^2) \\
&= 0.5\, \mathrm{Log}_B (I^2 \cdot (1 + (Q^2/I^2))) \\
&= 0.5\, (\mathrm{Log}_B (I^2) + \mathrm{Log}_B (1 + (Q^2/I^2))) \\
&= 0.5 \times 2\, \mathrm{Log}_B |I| + 0.5\, \mathrm{Log}_B (1 + B^{-2(\mathrm{Log}_B|I| - \mathrm{Log}_B|Q|)}) \\
&= \mathrm{Log}_B |I| + 0.5\, \mathrm{Log}_B (1 + B^{-2(\mathrm{Log}_B|I| - \mathrm{Log}_B|Q|)}) \\
&= \mathrm{Log}_B |I| + F(\mathrm{Log}_B |I| - \mathrm{Log}_B |Q|) \\
&= X + F(X - Y), \text{ where } X \text{ and } Y \text{ respectively} \\
&\quad \text{define the larger and the smaller of the} \\
&\quad \text{two logarithmic values } \mathrm{Log}_B |I| \text{ and} \\
&\quad \mathrm{Log}_B |Q| \text{ for the purposes of the} \\
&\quad \text{description of the preferred embodiment.} \\
&= X + F(|D|), \text{ where } |D| = X - Y \text{ or the} \\
&\quad \text{absolute value of the difference between} \\
&\quad \text{the logarithmic values } \mathrm{Log}_B (I) \text{ and} \\
&\quad \mathrm{Log}_B (Q).
\end{aligned}$$

Thus, $C = \mathrm{Antilog}_B (X + F(|D|))$

The present magnitude detector 24 determines the magnitude values of the vector sum C of the orthogonal component signals I and Q according to the equation:

$$C = \mathrm{Antilog}_B (X + F(|D|))$$

To this end, the signal sequence comprising I and Q magnitude values present at the terminal 22 is applied to the element 50, which determines the logarithmic values $\mathrm{Log}_B |I|$ and $\mathrm{Log}_B |Q|$ to the base B. The element 50 may be a ROM having an input port to which the I and Q magnitude values are applied as address codes. The memory locations corresponding to the respective address codes may be programmed to provide the associated log values at the output port of the ROM 50. The use of a ROM for determining logarithmic values eliminates the necessity of real time calculations.

The base B to which logarithms are taken is selected to obtain high accuracy by maximizing the use of the available bits of the digital logarithms. Specifically, for a system arranged to process N-bit logarithmic values corresponding to M-bit signal samples including a sign bit, the logarithmic base B is equal to $$\mathrm{Antiln}\left(\frac{\mathrm{Ln}(2^{M-1} - 1)}{2^N - 1}\right),$$

where Ln designates the Naperian logarithm.

The $\mathrm{Log}_B |I|$ and $\mathrm{Log}_B |Q|$ values are temporarily stored in the respective latches 52 and 54 in response to the appropriate I and Q clock signals. The output of the $\mathrm{Log}_B |I|$ and $\mathrm{Log}_B |Q|$ latches 52 and 54 are made available at the respective input ports of a larger number selector 56 and a smaller number selector 58. The larger and the smaller number selectors 56 and 58 produce at their respective outputs the larger and the smaller value of the $\mathrm{Log}_B |I|$ and $\mathrm{Log}_B |Q|$ values currently stored in the latches 52 and 54.

Figure 3:
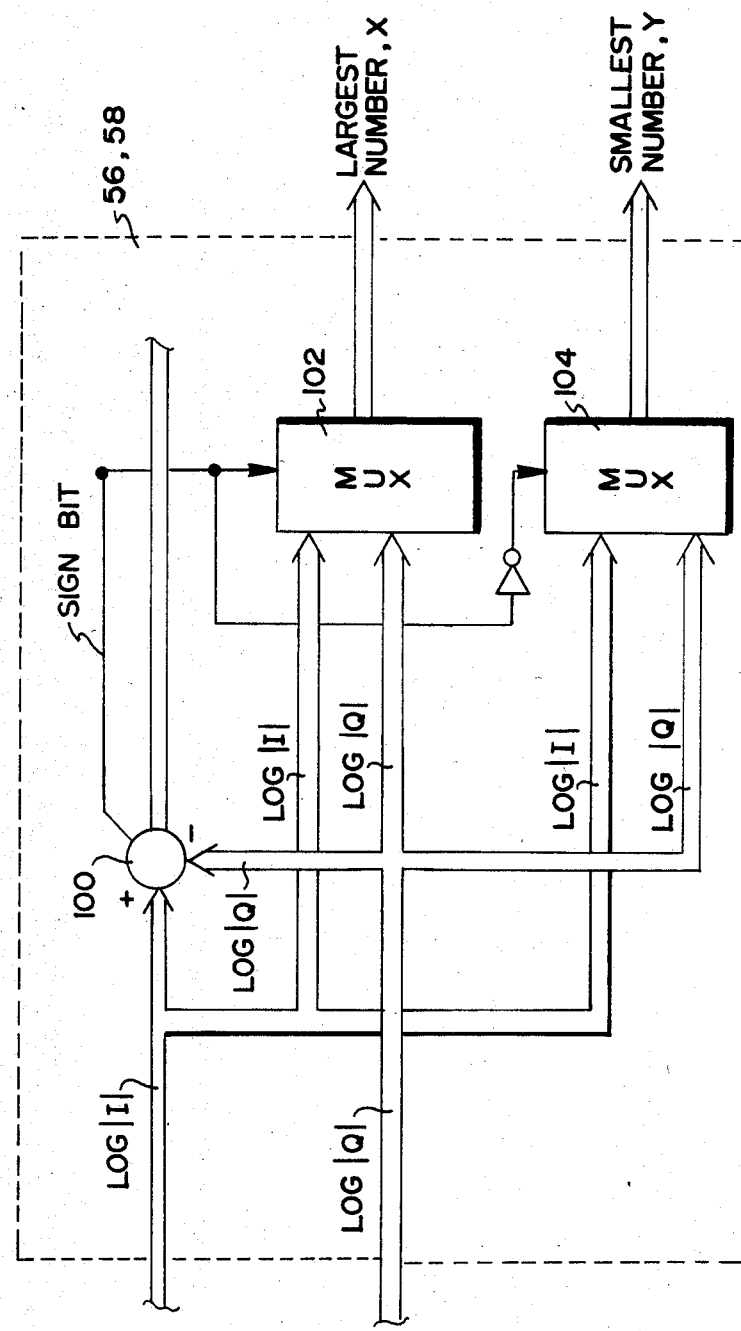
FIG. 3 is an expanded block diagram of a portion of the FIG. 2 circuitry.

An illustrative implementation of the larger and the smaller number detectors 56 and 58 is depicted in FIG. 3. The $\mathrm{Log}_B |I|$ and $\mathrm{Log}_B |Q|$ signals are respectively applied to the minuend and subtrahend input ports of a subtractor 100, and the sign bit of the difference produced by the subtracter is examined. If the sign bit is zero, it means that the difference $(\mathrm{Log}_B |I| - \mathrm{Log}_B |Q|)$ is positive, and that $\mathrm{Log}_B$ is the larger of the two logarithmic values $\mathrm{Log}_B |I|$ and $\mathrm{Log}_B |Q|$. On the other hand, if the sign bit is one, it means that $\mathrm{Log}_B |I|$ is the smaller of the two logarithmic values. A multiplexer 102 having the $\mathrm{Log}_B |I|$ and $\mathrm{Log}_B |Q|$ signals applied to its respective input ports produces the larger of the two inputs (i.e., X) at its output port in response to the sign bit. Similarly, a multiplexer 104, responsive to the sign bit, makes available at its output port the smaller of the two inputs (i.e., Y).

The polarity of the smaller value Y of the two inputs $\mathrm{Log}_B |I|$ and $\mathrm{Log}_B |Q|$ is reversed by a 2's complement circuit 60 coupled to the output of the smaller number selector 58. The circuit 60 may comprise an inverter for inverting all of the input bits, and an adder for adding 1 to the least significant bit position of the inverted number to generate the 2's complement of the input number.

The summing circuit 62 adds the 2's complement of the smaller value Y of the two inputs $\mathrm{Log}_B |I|$ and $\mathrm{Log}_B |Q|$ to the corresponding larger value X to produce the absolute value of the difference $|D|$ between the two inputs $\mathrm{Log}_B |I|$ and $\mathrm{Log}_B |Q|$. The absolute value of the difference $|D|$ is applied to an element 64, which produces at the output thereof a value:

$$F(|D|) = 0.5\, \mathrm{Log}_B (1 + B^{-2|D|})$$

The element 64 may be a ROM to which the absolute value $|D|$ of the difference between the two inputs $\mathrm{Log}_B |I|$ and $\mathrm{Log}_B |Q|$ is applied as an address code, and which is programmed to develop at its output port a value equal to $F(|D|)$.

A summing circuit 66 adds the output $F(|D|)$ of the element 64 to the larger value X of the two inputs $\mathrm{Log}_B |I|$ and $\mathrm{Log}_B |Q|$ after the larger value is delayed by an appropriate time interval by a delay element 68 to assure that the larger value reaches the summing circuit substantially coincident with the corresponding correction value. The element 70 generates the $\mathrm{Antilog}_B$ of the output of the summing circuit 66 to produce a value substantially equal to the magnitude C of the vector sum of the orthogonal signals I and Q.

The application of the subject magnitude detector 24 will be explained with the aid of an example.

- Assume 7-bit chroma samples including the sign bit (i.e., M = 7), and N-bit logarithms (i.e., N = 7).
- B = 1.033161, using the formula given above for the logarithmic base B.
- $F(|D|) = 0.5 \, \text{Log}_B (1 + B^{-2|D|})$
  $= 0.5 \, \text{Log}_B (1 + 1.033161^{-2|D|})$
- F-Table:

| Range $|D|$ | $F(|D|)$ |
|---|---|
| 0 | 11 |
| 1–2 | 10 |
| 3–4 | 9 |
| 5–6 | 8 |
| 7–8 | 7 |
| 10–12 | 6 |
| 13–16 | 5 |
| 17–20 | 4 |
| 21–26 | 3 |
| 27–34 | 2 |
| 35–51 | 1 |
| 52–127 | 0 |

- Calculations:
- Assume I = 8, Q = 24
- $\text{Log}_B |I| = 64$, $\text{Log}_B |Q| = 97$
- X = Larger of $\text{Log}_B |I|$ and $\text{Log}_B |Q|$
  $= 97$
- Y = Smaller of $\text{Log}_B |I|$ and $\text{Log}_B |Q|$
  $= 64$
- $D = X - Y$
  $= 97 - 64$
  $= 33$
- $F(|D|) = 2$, from the F-Table
- $\text{Log}_B \sqrt{I^2 + Q^2} = X + F(|D|)$
  $= 97 + 2$
  $= 99$
- $C = \sqrt{I^2 + Q^2}$
  $= \text{Antilog}_B 99$
  $= 25.27$ (estimated)
  $\approx 25.3$ (actual)

It will be noted that a higher resolution may be obtained by increasing the number of bits in the signal samples (i.e., M) or in the logarithmic values (i.e., N). In this instance, the ranges of values D decrease in size for each incremental change of F(D). Alternatively, the resolution may be enhanced by lessening the value of each incremental change of F(D) to create a greater number of ranges for D.

It will also be noted from the F-table that only eleven correction values F(D) (i.e., 1 to 11) are required for the differences D represented by 7-bit samples. Thus the size of the ROM may be significantly reduced by appropriate decoding of the ROM address input codewords.

The subject invention requires no multiplier circuitry and only a small table of correction values, and thus achieves a higher resolution at lower hardware costs compared to other techniques mentioned above.

What is claimed is:

1. Apparatus for generating the magnitude value of the vector sum of a pair of quadrature-related component vectors comprising:
    means for receiving the magnitude values I and Q of said pair of quadrature-related component vectors;
    means for generating an associated pair of logarithmic values $\text{Log}_B |I|$ and $\text{Log}_B |Q|$ to a base B;
    means for calculating the absolute value $|D|$ of the difference between said logarithmic values $\text{Log}_B |I|$ and $\text{Log}_B |Q|$;
    means for generating a correction value $F(|D|)$ equal to $0.5 \, \text{Log}_B (1 + B^{-2|D|})$;
    means including means for determining the larger of said logarithmic values $\text{Log}_B |I|$ and $\text{Log}_B |Q|$, and for adding the correction value to the larger of the logarithmic values $\text{Log}_B |I|$ and $\text{Log}_B |Q|$; and
    means for producing the antilog of the sum of the correction value and the larger of the logarithmic values $\text{Log}_B |I|$ and $\text{Log}_B |Q|$, to generate a value C substantially equal to the magnitude of the vector sum of said quadrature-related component vectors.

2. Apparatus as defined in claim 1 wherein said means for calculating the difference between said logarithmic values $\text{Log}_B |I|$ and $\text{Log}_B |Q|$ comprises:
    means for determining the the smaller of said logarithmic values, and
    further means for subtracting the smaller of said logarithmic values from the larger of said logarithmic values.

3. Apparatus as defined in claim 2 wherein said subtracting means consists of:
    means for determining a 2's complement of said smaller logarithmic value; and
    means for additively combining said 2's complement of said smaller logarithmic value with said larger logarithmic value to obtain the absolute value of said difference between said logarithmic values.

4. Apparatus as defined in claim 3 wherein said 2's complement determining means comprises:
    means for inverting the bits of said smaller logarithmic value; and
    means for adding a +1 to the least significant bit position of the inverted value of said smaller logarithmic value to generate said 2's complement.

5. Apparatus as defined in claim 1 wherein said logarithmic value generating means comprises a ROM to which the I and Q amplitude values are applied as address codes, and which is programmed to contain the associated logarithmic values $\text{Log}_B |I|$ and $\text{Log}_B |Q|$ at the respective memory locations.

6. Apparatus as defined in claim 1 wherein said correction value generating means consists of a ROM to which an absolute difference value $|D|$ is applied as an address code, and which is programmed to contain the associated correction value $F(|D|)$ value at the corresponding memory location.

7. Apparatus as defined in claim 1 wherein said antilog producing means comprises a ROM to which an output of said means including means for adding is applied as an address code, and which is programmed to contain the associated antilog value at the respective memory location.

8. Apparatus for generating the magnitude value of the vector sum of a pair of quadrature-related component vectors comprising:
    an input port for applying the amplitude values I and Q of said pair of quadrature-related component vectors;
    means, coupled to said input port, for generating an associated pair o logarithmic values $\text{Log}_B |I|$ and $\text{Log}_B |Q|$ to a base B;
    means, coupled to said generating means, for subtracting one of said logarithmic values from the other of said logarithmic values to form a difference value D;

means, coupled to said subtracting means, for generating a correction value equal to 0.5 $\text{Log}_B (1+B^{-2D})$;

means, coupled to said correction value generating means, for adding said correction value to said other logarithmic value; and means for producing the antilog of the output value of said adding means to generate a value C substantially equal to the magnitude of the vector sum of said quadrature-related component vectors.

9. Apparatus as defined in claim 8 wherein said subtracting means consists of:

means for determining a 2's complement of said one logarithmic value; and means for additively combining said 2's complement of said one logarithmic value with said other logarithmic value to obtain said difference value D.

10. Apparatus as defined in claim 8 wherein said logarithmic value generating means comprises a ROM to which the I and Q amplitude values are applied as address codes, and which is programmed to contain the associated logarithmic values $\text{Log}_B |I|$ and $\text{Log}_B |Q|$ at the respective memory locations.

11. Apparatus as defined in claim 8 wherein said correction value generating means consists of a ROM to which a difference value D is applied as an address code, and which is programmed to contain the associated correction value at the corresponding memory location.

12. Apparatus as defined in claim 8 wherein said antilog producing means comprises a ROM to which the output of said adding means is applied as an address code, and which is programmed to contain the associated antilog value at the respective memory location.

* * * * *